Jan. 5, 1971  F. M. WILLIAMS  3,551,967

CONCRETE PIPE MOLDING APPARATUS

Filed July 18, 1968  2 Sheets-Sheet 1

INVENTOR.
FRANK M. WILLIAMS
BY Jerome R. Cox
ATTORNEY

Jan. 5, 1971  F. M. WILLIAMS  3,551,967

CONCRETE PIPE MOLDING APPARATUS

Filed July 18, 1968  2 Sheets-Sheet 2

INVENTOR.
FRANK M. WILLIAMS
BY *Jerome R. Cox*
ATTORNEY

United States Patent Office 3,551,967
Patented Jan. 5, 1971

3,551,967
CONCRETE PIPE MOLDING APPARATUS
Frank M. Williams, 6750 High St.,
Worthington, Ohio 43085
Filed July 18, 1968, Ser. No. 745,782
Int. Cl. B28b 21/16
U.S. Cl. 25—30                                  8 Claims

ABSTRACT OF THE DISCLOSURE

An apparatus and method of manufacturing concrete pipe are disclosed. The pipe is moulded in a mould comprising a base, an inner cylindrical form and an outer cylindrical form. A vibratory driver is attached to metal cylindrical reinforcing cages ordinarily made of steel mesh. The pipe mould is filled with concrete, the reinforcing cages with the attached driver are raised above the filled mould and set upon the plastic concrete. The vibratory driver is activated and the reinforcing cages are driven down in the plastic concrete to the designated position by the vibration of the driver.

BACKGROUND

This invention relates to the manufacture of concrete pipe which is formed with a reinforcing cage or cages within its wall and more particularly to the manufacture of such pipe by the use of vibrators to position the reinforcing cage in the plastic concrete.

Concrete pipe is conventionally made in relatively short pipe segments which are installed end to end. The individual segments are made by moulding them in a mould comprising a base and an exterior cylindrical form. Either (1) a concentric interior form is also used or (2) alternatively a packer head for packing concrete against the interior of the outer form is used thus eliminating the need for the inner mould wall. The pipe segments, hereinafter referred to simply as "pipes" for brevity, are strengthened by casing concrete around the reinforcing cages.

The common method of manufacturing concrete pipe begins with assembly of a mould. After assembling the mould one or several reinforcing cages are lowered into it. When the reinforcing cage is secured in the mould, plastic concrete is dropped into the mould and around the cage. A concrete packer head is then used to pack the concrete in the mould against the outer form and the cage. If, alternatively, an inner form is used instead of a packer head, sometimes, after the concrete is cast and worked in around the cage, vibration is applied to the mould to improve the density of the concrete and remove excess air from the concrete. This additionally produces a tighter bond between the cage and the concrete.

Because of the size, weight and cost of a packer head, and because of the inefficiency and poor quality of the alternative method, it has heretofore been commercially impractical to manufacture good quality concrete pipe on location at a construction site. As a result, high shipping costs must be borne because of the size and cumbersome shape of concrete pipe.

Furthermore, there is a need for a method for pipe manufacture which can be performed in a significantly smaller amount of time than prior conventional methods.

It is therefore an object of my invention to provide an improved method and apparatus for concrete pipe manufacture.

A further object of my invention is to provide a pipe manufacturing apparatus which is entirely portable and which can efficiently be operated at a construction site.

A further object of my invention is to provide a method and apparatus which significantly reduce the time consumed in the manufacture of concrete pipe.

A further object of my invention is to provide a method and apparatus for pipe manufacture which requires less skill and fewer men to operate.

Further objects and features of my invention will be apparent from the following specification and claims when considered in connection with the accompanying drawings illustrating my invention.

SUMMARY OF THE INVENTION

I have found that the foregoing and other objects of my invention may be attained with my improved method for manufacturing concrete pipe the method being of the type utilizing a pipe mould and a reinforcing cage to be placed into the mould wherein the improvement comprises in order the steps of: (a) assembling an inner and outer wall of an annular pipe mould; (b) filling the mould with plastic concrete; and (c) driving the reinforcing cage longitudinally into the plastic concrete by mechanical vibrations; wherein the plastic concrete containing the reinforcing cage is thereby prepared for subsequent curing and removal from the mould.

I have further found that the foregoing and other objects may be attained in an apparatus for the manufacture of concrete pipe by vibrating a reinforcing cage into plastic concrete, the apparatus comprising: (a) a pipe mould for containing plastic concrete; (b) a reinforcing cage for positioning within the pipe mould; and (c) a vibration means linked to the reinforcing cage for inducing vibrations in the cage and thereby driving it into plastic concrete contained by the pipe mould.

DESCRIPTION OF THE VIEWS

Figure 2:
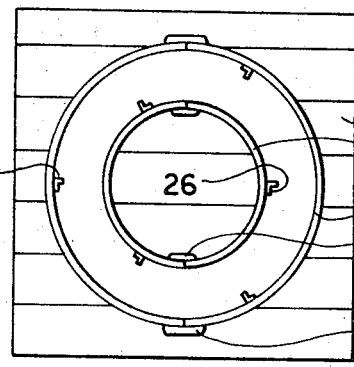
FIG. 2 is a plan view of the mould illustrated in FIG. 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Figure 1:
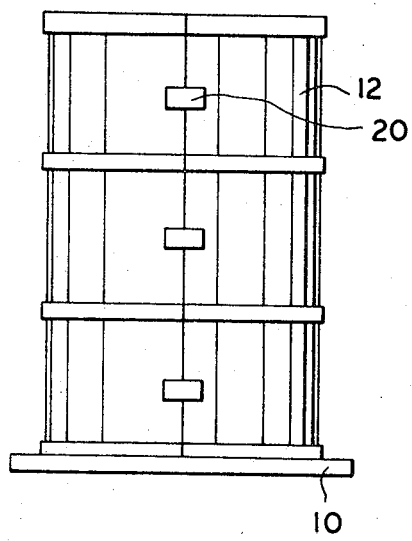
FIG. 1 is a view in front elevation of a mould used in an embodiment of my invention.

In FIG. 1 and FIG. 2, I show the pipe mould structure which I prefer to use in the practice of my invention. The mould has a wooden base 10 upon which are positioned a cylindrical outer form 12 and a co-axial cylindrical inner form 14. As seen in detail in FIG. 5, the base 10 is provided with an outer circular groove 16 and a concentric inner circular groove 18 into which the outer form 12 and the inner form 14 seat. The outer form 12 and the inner form 14 each comprises two semi-cylindrical halves which are held together by clamps such as clamps 20 and 22.

Figure 5:
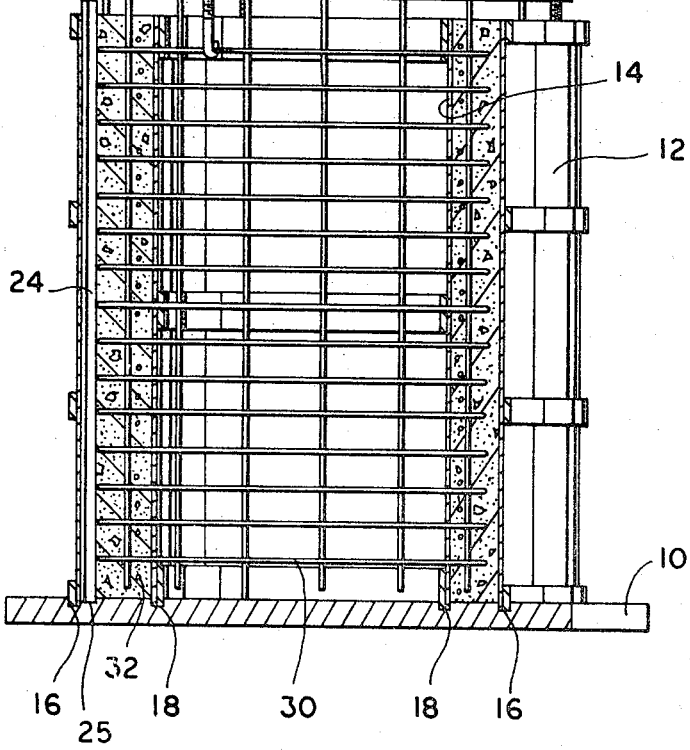
FIG. 5 is a view partly in front elevation and partly in vertical section showing the mould of FIGS. 1 and 2 with a pipe segment freshly moulded according to my invention, the vertical section being taken substantially along the line 5—5 of FIG. 6.

Six structural angle guides such as guides 24 and 26 are vertically positioned in the mould. Three of these guides are equally spaced around the inner form 14 each one having a leg flat against the inner form. The other three guides are similarly equally spaced around the outer form 12. Suitable slots are provided in the base 10 into which the bottom end of the guides are inserted and by which the guides are held in position. The guide 24 and its cooperating slot 25 are illustrated in FIG. 5. These six structural angles serve as guides for the entry of the reinforcing cage into the mould as will be described below.

Figure 4:
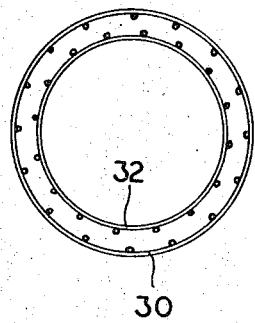
FIG. 4 is a view in horizontal section taken substantially along the line 4—4 of FIG. 3 and showing the reinforcing cages illustrated in FIG. 3.
Figure 3:
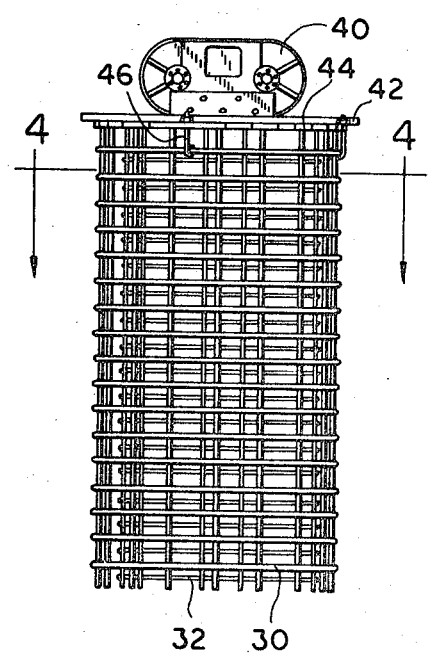
FIG. 3 is a view in front elevation of the reinforcing cages and an attached vibratory driver used in an embodiment of my invention.

FIG. 3 and FIG. 4 illustrate the reinforcing cages and the vibrating driver used in an embodiment of my invention. Most concrete pipe requires an outer reinforcing cage 30 and an inner reinforcing cage 32. Only one cage might be used if desired. Each cage is constructed of wire mesh welded into a cylindrical shape. For purposes of my invention a vibratory driver 40 is connected to the reinforcing cages so that it will induce vibrations in the cages.

Figure 6:
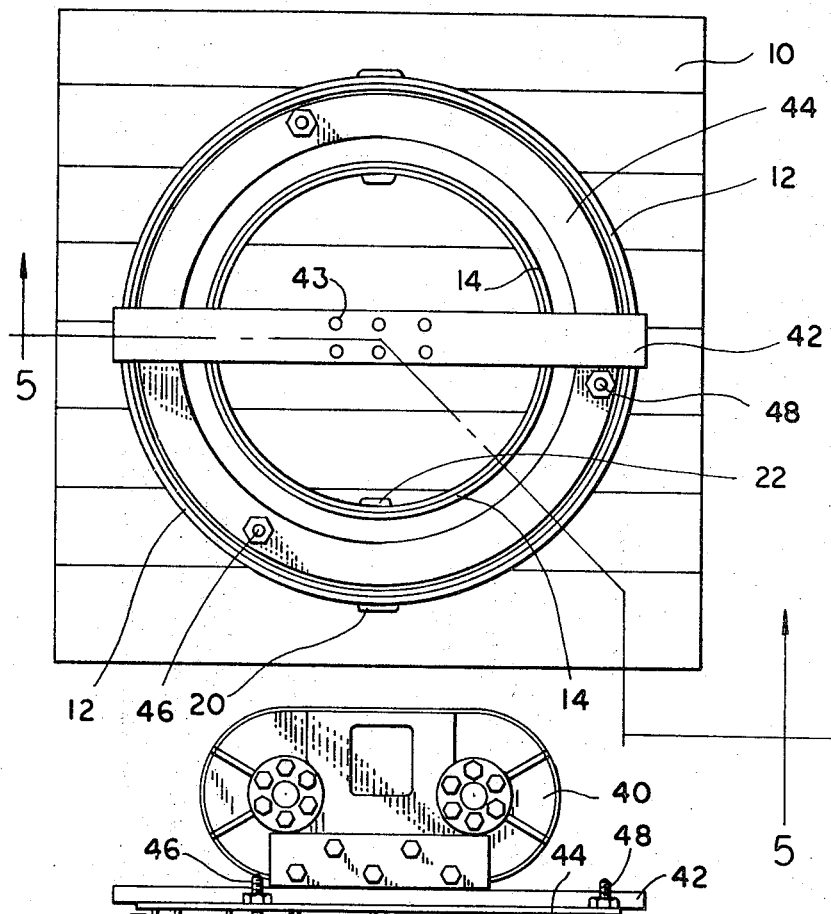
FIG. 6 is a plan view of the assembly of FIG. 5 with the vibratory driver removed.

As shown most clearly in FIG. 5 and FIG. 6 the vibratory driver 40 (not shown in FIG. 6) is bolted to a strap 42 by means of bolts such as bolt 43. The strap 42 is tack welded to a pallet ring 44 which sits on top of the reinforcing cages 30 and 32. The reinforcing cages 30 and 32 are secured to the pallet ring 44 by means of J-bolts such as J-bolts 46 and 48. In this manner the reinforcing cages are linked to the vibratory driver 40 so that vibrations of the driver 40 are able to induce vibrations in the cages and drive them into the plastic concrete to be poured into the mould.

Various vibrating means are available which might be used in my invention. I prefer and illustrate a device having a pair of synchronized counter rotating eccentric weights. These can be driven by a motor and flexible drive shaft or by a hydraulic system. Research is currently being done on other suitable devices such as piezoelectric vibrators.

OPERATION

To construct a pipe segment utilizing my invention, the mould is first assembled by seating the outer form 12 and the inner form 14 in the circular grooves 16 and 18 in the base 10. The guides, such as guides 24 and 26 are inserted in the slots in the base 10 and clamped to the forms near their top edges by using C clamps for example. The guides should be long enough to project above the top surface of the concrete for reasons to hereinafter become evident. The walls of the mould should then be treated to prevent adhesion of the concrete.

Portland cement concrete is poured from a suitable container down a spout and into the mould until the mould is nearly full. The reinforcing cages 30 and 32, secured to the vibratory driver 40 as illustrated in FIG. 3, are then lifted above the mould. The bottom of the cages are positioned concentrically above the forms 12 and 14 and between the guides. The vibratory driver 40 is actuated and the bottom of the reinforcing cages is inserted into the exposed top of the concrete which, of course, is still in a plastic state.

The vibrations induced in the cages by the vibratory driver 40, aided by the weight of the cages, serve to force the cages down into the plastic concrete to the position illustrated in FIG. 5. I have found that two reinforcing cages can be driven into the plastic concrete in approximately one and one half minutes depending on the pipe size. I prefer to continue the vibrations after the cages are completely inserted for the conventional purposes described above.

The most desirable frequency of vibration depends upon the cage size and weight and upon the composition of the concrete. I have used frequencies in the sonic range.

The nuts on the J-bolts, such as J-bolts 46 and 48, are then removed so that the pallet ring 44 and the vibratory driver 40 may be detached from the reinforcing cages 30 and 32. The J-bolts are removed from the concrete.

The vibratory driver 40 can now be suitably attached to the guides, one at a time, and be used to withdraw the guides from the concrete. Withdrawal by use of the driver 40 not only facilitates removal of the guides but also insures that plastic concrete will fill the space vacated by the guides. The upper end of the pipe should be troweled to form a tongue or groove and the pipe is then cured by wet burlap under polyethylene sheeting.

The materials and apparatus required for practice of my invention are either already present at the usual construction site or can be transported there with little difficulty. Thus, quality pipes may be efficiently manufactured at the construction site and thereby the expense of shipping such pipes is eliminated.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:
1. An apparatus for the manufacture of concrete pipe by vibrating a reinforcing cage into plastic concrete, the apparatus comprising:
 (a) a pipe mould comprising inner and outer tubular forms for containing plastic concrete;
 (b) a reinforcing cage for positioning within the pipe mould; and
 (c) a vibration means mounted to the reinforcing cage but not to the mould for inducing longitudinal vibrations in the cage for driving it into plastic concrete contained by the pipe mould.
2. An apparatus according to claim 1,
 wherein the mould is provided with longitudinally oriented guides within the mould for guiding the cage into the mould.
3. An apparatus according to claim 2,
 wherein the guides comprise structural angles.
4. An apparatus according to claim 3,
 wherein the angles are sufficiently long to extend out of the plastic concrete for attachment thereto of a vibrating means for vibrating the guides out of the plastic concrete.
5. An apparatus according to claim 1, wherein:
 (a) the pipe mould comprises inner and outer cylindrical co-axial tubular forms;
 (b) the reinforcing cage comprises a cylindrical steel mesh tube; and
 (c) the vibration means is a vibratory driver.
6. An apparatus according to claim 1, wherein:
 (a) the pipe mould comprises a base having two spaced concentric circular grooves, an inner cylindrical form seated in the inner of said grooves, and an outer cylindrical form seated in the outer of said grooves;
 (b) longitudinally oriented guides positioned within the mould and against said forms;
 (c) the reinforcing cage comprises a pair of cylindrical steel mesh tubes having suitable diameters for being positioned within the mould between the guides; and
 (d) the vibration means comprises a vibratory driver.
7. An apparatus according to claim 6, wherein:
 (a) the vibratory driver is attached to a strap;
 (b) the strap is attached to a pallet ring having a plurality of holes; and
 (c) a plurality of J-bolts are hooked around the reinforcing cage, inserted through said holes, and tightened to secure the reinforcing cage to the pallet ring.
8. An apparatus according to claim 1,
 wherein the mould is provided with longitudinally oriented guides within the mould extending substantially continuously the entire length of the mould for guiding the cage into the mould.

(References on following page)

References Cited

UNITED STATES PATENTS

| | | | |
|---|---|---|---|
| 1,150,828 | 8/1915 | Souder | 25—118 |
| 1,592,671 | 7/1926 | Nichols | 25—118 |
| 1,865,652 | 7/1932 | Upson | 25—41X |
| 2,091,385 | 8/1937 | Trickey | 25—41X |
| 2,524,676 | 10/1950 | Nielson | 25—30 |
| 3,060,094 | 10/1962 | Holmes | 25—118X |
| 3,471,986 | 10/1969 | Swenson | 25—118X |

J. SPENCER OVERHOLSER, Primary Examiner

BEN D. TOBOR, Assistant Examiner

U.S. Cl. X.R.

25—41, 124; 249—173; 264—23, 69